United States Patent [19]

Kagawa et al.

[11] Patent Number: 5,350,648
[45] Date of Patent: Sep. 27, 1994

[54] NONAQUEOUS SECONDARY BATTERY

[75] Inventors: Yoshikatsu Kagawa; Shoichiro Yasunami; Yukio Maekawa, all of Kanagawa, Japan

[73] Assignee: Fuji Photo Film Co., Ltd., Kanagawa, Japan

[21] Appl. No.: 42,169

[22] Filed: Apr. 2, 1993

[30] Foreign Application Priority Data

Apr. 2, 1992 [JP] Japan ............... 4-081008

[51] Int. Cl.$^5$ .................. H01M 6/14; H01M 4/58
[52] U.S. Cl. ..................... 429/218; 429/194
[58] Field of Search .................. 429/218, 194

[56] References Cited

U.S. PATENT DOCUMENTS

| | | | |
|---|---|---|---|
| 4,702,977 | 10/1987 | Hiratsuka et al. | 429/194 |
| 4,835,075 | 5/1989 | Tajima et al. | 429/194 |
| 4,945,014 | 7/1990 | Miyabayashi et al. | 429/218 |
| 5,162,170 | 11/1992 | Miyabayashi et al. | 429/218 X |
| 5,176,969 | 1/1993 | Miyabayashi et al. | 429/218 |
| 5,187,035 | 2/1993 | Miyabayashi et al. | 429/218 |

FOREIGN PATENT DOCUMENTS 0328131  8/1989  European Pat. Off. .
124380   5/1988  Japan .

*Primary Examiner*—John S. Maples
*Attorney, Agent, or Firm*—Sughrue, Mion, Zinn, Macpeak & Seas

[57] ABSTRACT

A nonaqueous secondary battery comprises an anode active material comprising a carbonaceous material, an electrolyte and a cathode active material comprising a lithium-containing transition metal chalcogenide. The carbonaceous material is obtained by burning a polyacrylonitrile fiber and has length of a crystallite in the c-axis direction of 75 to 250 Å and an interval of 002 faces of 3.41 to 3.44 Å, the length and the interval being determined from an X-ray diffraction spectrum thereof using a Cu-Kα ray.

6 Claims, 5 Drawing Sheets

NONAQUEOUS SECONDARY BATTERY

FIELD OF THE INVENTION

This invention relates to a nonaqueous secondary battery containing no lithium metal which has high charging-discharging capacity and excellent characteristics in charge-discharge cycle.

BACKGROUND OF THE INVENTION

A nonaqueous secondary battery basically comprises an anode active material, a electrolyte and a cathode active material comprising a lithium-containing transition metal chalcogenide and the like. In the secondary battery using lithium metal as the anode active material, highly active tree-like lithium metal (dendrite) or mossy lithium metal (moss) is formed on the anode during repetition of charging and discharging. When the dendrite or the moss peels off to become in contact with the cathode active material of the battery or when it grows to touch the cathode active material directly, an inner short circuit is produced within the battery. Therefore, such battery, which has insufficient characteristics in charge-discharge cycle, is also in great danger of ignition. In order to solve this problem, proposed are some batteries using lithium alloys such as Al, Al-Mn (U.S. Pat. No. 4,820,599), Al-Mg (Japanese Patent Provisional Publication No. 57(1982)-98977), Al-Sn (Japanese Patent Provisional Publication No. 63(1988)-6742), Al-In and Al-Cd (Japanese Patent Provisional Publication No. 1(1989)-144573). Use of these alloys, however, can not essentially prevent the battery from the production of inner short circuit, because lithium metal is still used for the anode active material.

Recently, as the battery using no lithium metal, proposed are some batteries using carbonaceous materials in which lithium metal or lithium ion can be intercalated and then deintercalated. Such carbonaceous materials are roughly classified into low-graphitized carbon and high-graphitized carbon; the former comprises both an amorphous portion and a crystalline portion, and the latter comprises little amorphous portion and is prepared by heating various low-graphitized carbons at a temperature of higher than 2,400° C. These two carbonaceous materials are clearly different from in terms of properties, so that they are generally distinguished each other and employed for different purposes ("*Carbonaceous Material Engineering*" by Michio Inagaki, published by NIKKAN KOGYO SHINBUN-SHA (1985)). These carbonaceous materials can be generally obtained as natural products or by burning various organic compounds.

High-graphitized carbon has essentially high charging-discharging capacity (*Physical Review B*, vol.42(1990), pp. 6424). However, when the high-graphitized carbon is used as an anode active material, the cathode material must be added in an excessive amount at the beginning of charge-discharge cycle because irreversible capacity loss, socalled "exfoliation", occurs (*Journal of Electrochemical Society*, vol.1,137(1990), pp.2009). Consequently, the charging-discharging capacity of such battery is relatively low. In order to solve this problem, a battery using the combination of the cathode containing no lithium metal and the anode comprising a compound sandwiching lithium metal between graphite layers (lithium metal-graphite-sandwich compound) which is previously prepared is proposed in Japanese Patent Publication No. 62(1987)-23433 and U.S. Pat. No. 4,423,125. However, the lithium metal-graphite-sandwich compound is in danger of ignition and decomposes in the presence of even a slight amount of water, and therefore it is difficult to incorporate such material in a battery. Further, a battery using the combination of the graphite anode and the cathode containing lithium metal is also proposed ("31st *Conference of Battery* (1990)" pp.97). Even in such battery, however, an excess amount of the cathode material must be added so as to compensate the capacity loss of the exfoliation. Consequently, such battery also hardly brings about increase of the capacity. Further, Japanese Patent Provisional Publication No. 3(1992)-129664 discloses a battery using the combination of the fine fibrous Graphite and the cathode containing lithium metal. However, this battery also has small charging-discharging capacity because the density of the graphite material is very small.

On the other hand, as for carbonaceous material showing low exfoliation, there are proposed many batteries in which low-graphitized carbon is used for the anode (Japanese Patent Provisional Publication Nos. 58(1983)-209864, 61(1986)-214417, 62(1987)-88269, 62(1987)-90863, 62(1987)-122066, 62(1987)-216170, 63(1988)-13282, 63(1988)-24555, 63(1988)-121247, 63(1988)-121257, 63(1988)-155568, 63(1988)-276873, 63(1988)-314821, 1(1989)-204361, 1(1989)-221859, 2(1990)-230660, 1(1989)-274360, 2(1990)-284354, 3(1991)-122974, and WO090/13,924). Even in the above batteries using low-graphitized carbon for the anode, however, the irreversible capacity loss at an early stage of charging which is caused by the exfoliation is still large. Thus, a lithium secondary battery having satisfactory charging-discharging capacity loss has not been produced up to now. In addition, low-graphitized carbonaceous material is known to show charging-discharging capacity lower than that of high-graphitized carbonaceous material (*Physical Review B*, vol.42 (1990), pp.6424).

As is described above, any of known carbonaceous materials does not have satisfying characteristics needed for an anode active material of a lithium secondary battery, such as reduced charging-discharging capacity loss, increased charging-discharging capacity and assured safety.

SUMMARY OF THE INVENTION

It is an object of the present invention to provide a nonaqueous secondary battery having an anode active material of a carbonaceous material which has high safety, high charging-discharging capacity, reduced charging-discharging capacity loss and a long life in charge-discharge cycle.

It is another object of the present invention to provide a small-sized lithium secondary battery having high energy density.

The present inventors have studied in order to obtain an anode active material having reduced charging-discharging capacity loss and increased charging-discharging capacity. As a result, they have found that a carbonaceous material giving an X-ray diffraction spectrum in the following range, satisfies the above excellent characteristics.

The invention resides in a nonaqueous secondary battery which comprises an anode active material comprising a carbonaceous material, an electrolyte and a cathode active material comprising a lithium-containing transition metal chalcogenide;

wherein said carbonaceous material has length of a crystallite in c-axis direction of 75 to 250 Å and an interval of 002 faces of 3.41 to 3.44 Å, said length and said interval being determined from an X-ray diffraction spectrum thereof using Cu-K$\alpha$ ray.

Preferred embodiments of the above nonaqueous secondary battery are as follows:

(1) The nonaqueous secondary battery wherein the carbonaceous material has an essentially single diffraction peak of which half width is in the range of 0.5 to 1.2 degree, the peak being shown in an X-ray diffraction spectrum thereof using Cu-K$\alpha$ ray.

(2) The nonaqueous secondary battery wherein the carbonaceous material is a burned polyacrylonitrile or a burned copolymer of acrylonitrile and other monomers polymerizable with the acrylonitrile.

(3) The nonaqueous secondary battery wherein the carbonaceous material is a burned polyacrylonitrile fiber.

(4) The nonaqueous secondary battery wherein the carbonaceous material is a burned polyacrylonitrile fiber of 0.4 to 40 denier.

(5) The nonaqueous secondary battery wherein the carbonaceous material has the magnetic resistance $(\Delta\rho/\rho)_{cr}$ of −0.01 to −0.99 (%).

(6) The nonaqueous secondary battery wherein the anode active material contains fine carbon particles and/or fine carbon fibers together with said carbonaceous material.

(7) The nonaqueous secondary battery as defined in claim 1, wherein the lithium-containing transition metal chalcogenide is $LiCoO_2$.

(8) The secondary battery wherein the lithium-containing transition metal chalcogenide is $Li_aCo_bV_cO_d$ (in which a=0 to 1.1, b=0.8 to 0.98, c=1-b and d=2.05 to 2.6).

The length (Lc) of a crystallite in c-axis direction is determined from an X-ray diffraction spectrum using Cu-K$\alpha$ ray in the following manner:

$$Lc(\text{Å})=K\cdot\lambda/\beta\cdot\cos\theta$$

in which K indicates 0.9, $\lambda$ indicates wave length of Cu-K$\alpha$ ray, $\beta$ indicates half width of a peek and $\theta$ indicates degree of diffraction.

The interval of 002 faces ($d_{002}$) is determined from an X-ray diffraction spectrum using Cu-K$\alpha$ ray in the following manner:

$$d_{002}(\text{Å})=\lambda/2\cdot\sin\theta$$

in which $\lambda$ indicates wavelength of Cu-K$\alpha$ ray and $\theta$ indicates degree of diffraction.

The interval of 002 faces ($d_{002}$) is also determined from a maximum of diffraction peak.

The invention also resides in a nonaqueous secondary battery which comprises an anode active material comprising a carbonaceous material, an electrolyte and a cathode active material comprising a lithium-containing transition metal chalcogenide;

wherein said carbonaceous material is obtained by burning polyacrylonitrile fiber of 0.4 to 40 denier at 2,400° to 3,500° C.

Preferred embodiments of the above nonaqueous secondary battery are as follows:

(1) The nonaqueous secondary battery wherein the carbonaceous material is obtained by burning said polyacrylonitrile fiber at 2,400° to 3,500° C., the carbonaceous material being subjected to a first burning step of heating said fiber at 150° to 300° C. and thereafter cooling, and a second burning step of burning said fiber at 400° to 2000° C. and thereafter cooling, before said burning at 2,400° to 3,500° C.

(2) The nonaqueous secondary battery wherein said carbonaceous material is obtained by burning said polyacrylonitrile fiber at 2,400° to 3,500° C., said carbonaceous material being subjected to a first burning step of heating said fiber at 150° to 300° C. and thereafter cooling, a second burning step of heating said fiber at 400° to 800° C. and thereafter cooling, and a third burning step of heating said fiber at 900° to 2000° C. and thereafter cooling, before said burning at 2,400° to 3,500° C.

(3) The nonaqueous secondary battery, wherein said burning of said polyacrylonitrile fiber is conducted in the condition of no orientation.

The nonaqueous secondary battery of the invention having an anode active material of a carbonaceous material which has length of a crystallite in c-axis direction of 75 to 250 Å and an interval of 002 faces of 3.41 to 3.44 Å, is extremely improved in charging-discharging capacity loss and charging-discharging capacity compared with a conventional nonaqueous secondary battery.

The carbonaceous material is advantageously obtained by burning polyacrylonitrile fiber of 0.4 to 40 denier at 2,400° to 3,500° C. In the burning, the polyacrylonitrile fiber receives restrain of arrangement, which is derived from CN bond of polyacrylonitrile, and therefore that it is supposed that the carbonaceous material of the invention is easily obtained by burning the specific polyacrylonitrile fiber in the specific conditions.

DETAILED DESCRIPTION OF THE INVENTION

Figure 1:
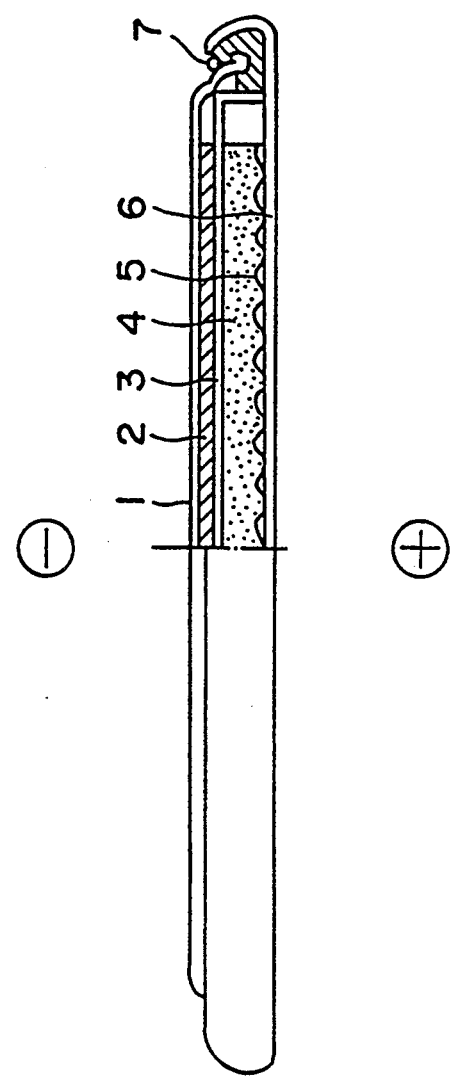
FIG. 1 is a schematic sectional view of a typical battery of coin-type according to the invention.

As materials (precursors) of the carbonaceous material used in the nonaqueous secondary battery of the invention, there can be mentioned fibers and resins of acrylonitrile homopolymer and copolymers of acrylonitrile and other monomer(s) polymerizable with the acrylonitrile.

Examples of the acrylonitrile copolymers include copolymers of acrylonitrile and at least one of monomers such as vinyl acetate, vinyl chloroacetate, acrylic acid, acrylic acid ester, methacrylic acid ester, itaconic acid ester, vinylpyridine, vinylquinoline, vinylimide, vinyloxazole, vinylimidazole, acrylamide, vinyl ether, methallyl alcohol, vinyl chloride, vinylidene chloride, styrene, vinyltoluene, allylsulfonate (Li, Na and K), methallylsulfonate (Li, Na and K), and vinylbenzenesulfonates (Li, Na and K).

The amount of the co-polymerized monomer unit is in a range of 0.01 to 50 wt.%, preferably 0.1 to 30 wt.% based on the total amount of the copolymer.

Fiber of the acrylonitrile homopolymer or copolymer (i.e., polyacrylonitrile fiber) is preferably used as material of the carbonaceous material of the invention. The molecular weight of the fiber preferably is in a range of 50,000 to 100,000. The characteristics of the carbonaceous material is considered to depend on the thickness of polyacrylonitrile fiber. The thickness of the fiber generally is in a range of 0.4 to 40 denier, preferably 5 to 25 denier, and more preferably 10 to 25 denier. Further, fibers may be generally classified into two types, i.e., the fibers having high gloss ("bright") and those having low gloss ("dull"). Preferred are bright fibers. Further profile cross section fibers and composite cross section fibers may be also employed.

The carbonaceous material is preferably prepared by burning the above-mentioned fiber at 2,400° to 3,500° C. (preferably in the condition of not orienting the fibers). Before the polyacrylonitrile fiber is heated at 2,400° to 3,500° C., the fiber is preferably subjected to a burning process of 2 or 3 steps. The burning process of 2 or 3 steps preferably includes a process comprising a combination of a first burning step of heating at 150° to 300° C. and a second burning step of heating at 400° to 2000° C. (three-steps burning process), or a combination of a first burning step of heating at 150° to 300° C., a second burning step of heating at 400° to 800° C. and a third burning step of heating at 900° to 2,000° C. (four-steps burning process).

The four-steps burning process is, for example, performed without orientation of the fiber in the manner described in Table 1 (four-steps). "Burning without orientation" in the present specification means that the fibers are not stretched in the direction of the fiber axis during burning process.

TABLE 1

| | Temp. (°C.) | Period (hour) | Atmosphere |
|---|---|---|---|
| Step 1 | 150–300 | 0.5–3 | air |
| Step 2 | 400–800 | 0.5–3 | inert gas or vacuum |
| Step 3 | 900–2000 | 0.5–3 | inert gas or vacuum |
| Step 4 | 2400–3500 | 0.5–5 | argon gas |

In the process for the preparation of the polyacrylonitrile carbonaceous material by carbonizing polyacrylonitrile fiber, the fiber is generally stretched in the direction of the fiber axis during burning process in order to give enough strength to the resultant carbonized material. Such process is named the burning with orientation. On the other hand, polyacrylonitrile fiber is preferably burned without orientation in the invention. The above four-steps burning process comprises: burning in air at 150° to 300° C. and thereafter cooling; burning in an inert Gas such as argon, helium and nitrogen or in vacuum at 800° to 2,000° C. and thereafter cooling; and finally burning at 2,400° to 3,500° C. As long as the final burning is carried out at higher than 2,400° C., the charging-discharging capacity loss can be considerably reduced. However, final burning is appropriately conducted at 2,400° to 3,500° C. to obtain the anode active material of the invention, preferably at 2,500° to 3,500° C. and more preferably at 3,000° to 3,500° C. Carbonizing stage is Generally carried out in inert Gases such as argon, helium and nitrogen or in vacuum. If the carbonizing stage is carried out in vacuum, the degree of vacuum is not more than 1 mmHG, and preferably not more than 0.1 mmHG. Preferably, the final burning is carried out in argon atmosphere. In each of the steps before the final burning step, cooling is generally conducted after heating (burning). The cooling is preferably conducted by allowing the burned material to reach room temperature.

Three step burning process shown in Table 2 is also advantageous to obtain the characteristics of X-ray diffraction of the carbonaceous material of the invention. The final burning step of the three steps burning process is also preferred to be carried out in the same manner as described in the four-steps burning step. In each of the steps before the final burning step, cooling is generally conducted after heating (burning). The cooling is preferably conducted in the same manner as above.

TABLE 2

| | Burning Conditions (3-Steps) | | |
|---|---|---|---|
| | Temp. (°C.) | Period (hour) | Atmosphere |
| Step 1 | 150–300 | 0.5–3 | air |
| Step 2 | 400–2000 | 0.5–3 | inert gas or vacuum |
| Step 3 | 2400–3500 | 0.5–5 | argon gas |

The carbonaceous material of the invention is advantageously obtained by the above process. In the carbonaceous material, the length of a crystallite in c-axis direction, which is determined from an X-ray diffraction spectrum thereof using Cu-K$\alpha$ ray, is in the range of 75 to 250 Å, preferably in the range of 80 to 200 Å and more preferably in the range of 85 to 170 Å. The interval of 002 faces, which is determined from the X-ray diffraction spectrum is 3.41 to 3.44 Å, preferably in the range of 3.41 to 3.43 Å, and more preferably in the range of 3.41 to 3.42 Å. Further, the carbonaceous material is preferred to have an essentially single diffraction peak of which half width (difference of values of $2\theta$) is in the range of 0.5 to 1.2 degree, the peak being shown in the X-ray diffraction spectrum. The carbonaceous material of the invention used as the anode active material, has a mean grain size of 2 to 150 $\mu$m, preferably 5 to 100 $\mu$m, which is generally prepared by graining the material into particles.

Fine carbon particles and fine carbon fibers is preferably mixed into the burned carbonaceous material used for the battery of the invention, and such mixed material preferably improves the conductivity. Preferable examples of such carbon include carbon blacks such as acetylene black, furnace black and ketchen black. The amount of the carbon is preferably not more than 30%, more preferably not more than 20%, and particularly preferably not more than 15%.

Binders and/or reinforcing agents generally used may be added into a mixture for anode (depolarizing mix for anode) containing the carbonaceous material of the invention.

Examples of binders include natural polysaccharide, synthesized polysaccharide, synthesized polyhydroxyl compounds, polymers obtained by polymerizing mainly acrylic acid, fluorine-containing compounds and synthesized rubber. Preferred examples include starch, carboxymethyl cellulose, diacetyl cellulose, hydroxylpropyl cellulose, polyethylene oxide, polyacrylic acid, polytetrafluoroethylene, polyfluorovinylidene, ethylene-propylene-diene copolymer and polyacrylonitrile-butadiene copolymer.

As the reinforcing agent, fibers which do not react with lithium can be employed. Preferred examples of such fibers include synthesized polymers or carbon fibers such as polypropylene fiber, polyethylene fiber and Teflon fiber. The fibers are preferably 0.1 to 4 mm in length and 0.1 to 50 denier in thickness, more preferably 1 to 3 mm in length and 1 to 6 denier in thickness.

For a battery of coin-type or button-type, the mixture for anode is molded and pressed to form a pellet, and the resultant pellet is used. For a battery of cylindrical type, an anode of sheet-type is used. Such anode of sheet-type is produced by applying the mixture onto a collector and then rolling the applied collector, or by superposing the pressed sheet of the mixture onto a collector and then rolling the superposed sheet. The obtained anode sheet is wound up to use for the battery.

Examples of the cathode active material comprising a lithium-containing transition metal chalcogenide employable for the invention include lithium compounds of $MnO_2$, $Mn_2O_4$, $Mn_2O_3$, $CoO_2$, $Co_xMn_{1-x}O_y$, $Ni_x$-$Co_{1-x}O_y$, $V_xMn_{1-x}O_y$, $Fe_xMn_{1-x}O_y$, $V_2O_5$, $V_3O_8$, $V_6O_{13}$, $Co_xV_{1-x}O_y$, $MoS_2$, $MoO_3$ and $TiS_2$ ($0<x<1$, $0<y<1$). Particularly preferred is $LiCoO_2$ or $Li_a$-$Co_bV_cO_d$ ($a=0$ to 1.1, $b=0.8$ to 0.98, $c=1-b$, and $d=2.05$ to 2.6). The lithium-containing transition metal chalcogenide is generally prepared by ion-exchange or by burning a lithium compound with a transition metal compound. Any known method can be used for preparing the transition metal chalcogenide, but the burning process is preferably carried out at 200° to 1,500° C. in air or in inert gases such as argon and nitrogen.

The electrolytic conductor comprises a solvent containing at least one aprotic organic solvent, and one or more lithium salts (comprising anion and lithium cation) which are soluble in the solvent.

Examples of the aprotic organic solvent include propylene carbonate, ethylene carbonate, diethylcarbonate, γ-butyrolactone, methyl formate, methyl acetate, 1,2-dimethoxyethane, tetrahydrofuran, 2-methyltetrahydrofuran, dimethyl sulfoxide, 1,3-dioxolan, formamide, dimethylformamide, dioxolan, acetonitrile, nitromethane, ethylmonoglyme, phosphoric acid triester (Japanese Patent Provisional Publication No. 60(1985)-23973), trimethoxymethane (Japanese Patent Provisional Publication No. 61(1986)-4170), dioxolan derivatives (Japanese Patent Provisional Publication Nos. 62(1987)-15771, 62(1987)-22372 and 62(1988)-108473), sulfolane (Japanese Patent Provisional Publication No. 62(1987)-31959), 3-methyl-2-oxazolidinone (Japanese Patent Provisional Publication No. 62(1987)-44961), propylene carbonate derivatives (Japanese Patent Provisional Publication Nos. 62(1987)-290069 and 62(1987)-290071), tetrahydrofuran derivatives (Japanese Patent Provisional Publication No. 63(1988)-32872), ethyl ether (Japanese Patent Provisional Publication No. 63(1988)-62166) and 1,3-propanesultone (Japanese Patent Provisional Publication No. 63(1988)-102173).

Examples of the lithium salt include: salts of $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}Cl_{10}^-$ (Japanese Patent Provisional Publication No. 57(1982)-74974) and $(1,2\text{-dimethoxyethane})_2ClO_4^-$ (Japanese Patent Provisional Publication No. 57(1982)-74977); lower aliphatic carboxylic acids (Japanese Patent Provisional Publication No. 60(1985)-41773); $AlCl_4^-$, $Cl^-$, $Br^-$ and $I^-$ (Japanese Patent Provisional Publication No. 60(1985)-247265); chloroborane (Japanese Patent Provisional Publication No. 61(1986)-165957); and tetraphenylborate (Japanese Patent Provisional Publication No. 61(1986)-214376).

A preferred example of the electrolyte is an electrolytic solution prepared by dissolving $LiClO_4$ or $LiBF_4$ in a mixture of propylene carbonate and 1,2-dimethoxyethane.

In addition to electrolytic solutions, solid electrolytes described below are also employable. Solid electrolytes can be classified into inorganic solid electrolytes and organic solid electrolytes.

As the inorganic solid electrolytes, lithium nitride, lithium halide and oxyacidic salts of lithium can be mentioned. Examples of the inorganic solid electrolytes preferably employable for the invention include $Li_3N$, $LiI$, $Li_5NI_2$, $Li_3N$-$LiI$-$LiOH$, $LiSiO_4$, $LiSiO_4$-$LiI$-$LiOH$ (Japanese Patent Provisional Publication No. 49(1974)-81899), $xLi_3PO_4$-$(1-x)$ $Li_4SiO_4$ (Japanese Patent Provisional Publication No. 59(1984)-60866), $Li_2SiS_3$ (Japanese Patent Provisional Publication No. 60(1985)-501731) and phosphorus sulfide compounds (Japanese Patent Provisional Publication No. 62(1987)-82665).

Examples of the organic solid electrolytes employable for the invention include: polyethylene oxide derivatives or polymers containing said derivatives (Japanese Patent Provisional Publication No. 63(1988)-135447); polypropylene oxide derivatives or polymers containing said derivatives; polymers containing ion-dissociating groups (Japanese Patent Provisional Publication Nos. 62(1987)-254302, 62(1987)-254303 and 63(1988)-193954); a mixture of polymers containing ion-dissociating groups and the above-mentioned aprotic electrolytic solutions (U.S. Pat. Nos. 4,792,504 and 4,830,939, Japanese Patent Provisional Publication Nos. 62(1987)-22375, 62(1987)-22376, 63(1988)-22375, 63(1988)-22776 and 1(1989)-95117); phosphoric acid ester polymer (Japanese Patent Provisional Publication No. 61(1986)-256573); and polymer matrix material containing aprotic polar solvent (U.S. Pat. Nos. 4,822,70 and 4,830,939, Japanese Patent Provisional Publication No. 63(1988)-239779, Japanese Patent Application Nos. 2(1990)-30318 and 2(1990)-78531).

In addition to the above solid electrolytes, an electrolytic solution containing polyacrylonitrile (Japanese Patent Provisional Publication No. 62(1987)-278774) may be also employed. Further, inorganic and organic solid electrolytes may be used in combination (Japanese Patent Provisional Publication No. 60(1985)-1768).

A separator provided between the anode and the cathode is an insulated film having both high ion permeability and desired mechanical strength. A generally used separator is a porous sheet or non-woven fabric made of olefinic polymers such as polypropylene or a sheet of glass fiber, because they have hydrophobic property and organic solvent resistance. Further, there can be employed a modified separator prepared by the method that acryloyl monomer having polyethylene oxide group connecting to the side chain is graft-polymerized by plasma on the surface of porous film of polypropylene or polyethylene.

The other compounds may be added into the electrolyte in order to improve characteristics in charge-discharge cycle. Examples of the compounds include pyridine (Japanese Patent Provisional Publication No. 49(1974)-108525), triethylphosphite (Japanese Patent Provisional Publication No. 47(1972)-4376), triethanolamine (Japanese Patent Provisional Publication No. 52(1977)-72425), cyclic ethers (Japanese Patent Provisional Publication No. 57(1982)-152684), ethylene diamine (Japanese Patent Provisional Publication No. 58(1983)-87777), n-grime (Japanese Patent Provisional Publication No. 58(1983)-87778), hexaphosphoric acid triamide (Japanese Patent Provisional Publication No. 58(1983)-87779), nitrobenzene derivatives (Japanese Patent Provisional Publication No. 58(1983)-214281), sulfur (Japanese Patent Provisional Publication No. 59(1984)-8280), quinoneimine dye (Japanese Patent Provisional Publication No. 59(1984)-68184), N-substituted oxazolidinone and N,N'-substituted imidazolidinone (Japanese Patent Provisional Publication No. 59(1984)-154778), ethylene glycol dialkyl ether (Japanese Patent Provisional Publication No. 59(1984)-205167), quaternary ammonium salts (Japanese Patent Provisional Publication No. 60(1985)-30065), polyethylene glycol (Japanese Patent Provisional Publication No. 60(1985)-41773), pyrrole (Japanese Patent Provisional Publication No. 60(1985)-79677), -2methoxyethanol (Japanese Patent Provisional Publication No. 60(1985)-89075), $AlCl_3$ (Japanese Patent Provisional Publication No. 61(1986)-88466), monomer of the conductive polymer used as the active material (Japanese Patent Provisional Publication No. 61(1986)-161673), triethylenephosphoramide (Japanese Patent Provisional Publication No. 61(1986)-208758), trialkylphophine (Japanese Patent Provisional Publication No. 62(1987)-80976), morpholine (Japanese Patent Provisional Publication No. 62(1987)-80977), aryl compounds having carbonyl group (Japanese Patent Provisional Publication No. 62(1987)-86673), crown ethers such as 12-crown-4 (*Physical Review B*, vol.42(1990) pp.6424), hexamethylphosphoric triamide and 4-alkylmorpholine (Japanese Patent Provisional Publication No. 62(1987)-217575), bicyclic tertiary amine (Japanese Patent Provisional Publication No. 62(1987)-217578), oils (Japanese Patent Provisional Publication No. 62(1987)-287580 ), quaternary phosphonium salts (Japanese Patent Provisional Publication No. 63(1988)-121268) and tertiary sulfonium salts (Japanese Patent Provisional Publication No. 63(1988)-121269).

In order to render the electrolytic solution noncombustible, halogen-containing solvents such as carbon tetrachloride and ethylene chloride trifluoride may be added (Japanese Patent Provisional Publication No. 48(1972)-36632). Further, carbon dioxide may be contained in the electrolytic solution so as to give preservability at high temperatures (Japanese Patent Provisional Publication No. 59(1984)-134567).

The cathode active material may contain an electrolytic solution or an electrolyte. Examples of the materials of the electrolytic solution or electrolyte include the above-mentioned ion conductive polymers and nitromethane (Japanese Patent Provisional Publication No. 48(1973)-36633, or electrolytic solutions (Japanese Patent Provisional Publication No. 57(1982)-124870).

Otherwise, the surface of the cathode active material may be modified. For example, the surface of the metal oxide can be treated with an agent for esterification (Japanese Patent Provisional Publication No. 55(1980)-163779), a chelating agent (Japanese Patent Provisional Publication No. 55(1980)-163780), conductive polymers (Japanese Patent Provisional Publication Nos. 58(1983)-163188 and 59(1984)-14274), or polyethylene oxide (Japanese Patent Provisional Publication No. 60(1985)-97561).

Further, the surface of the anode active material may be modified. For example, a layer of ion conductive polymer or a layer of polyacetylene may be provided on the surface (Japanese Patent Provisional Publication No. 58(1983)-111276), or the surface may be treated with LiCl (Japanese Patent Provisional Publication No. 58(1983)-142771) or with ethylene carbonate (Japanese Patent Provisional Publication No. 59(1984)-31573).

As the carrier of the cathode active material, foil of stainless steel, nickel or aluminum is generally used. In addition to these metals, also employable are porous foamed metal, which is suitable for conductive polymer (Japanese Patent Provisional Publication No. 59(1984)-18578), titanium (Japanese Patent Provisional Publication No. 59(1984)-68169), expanded metal (Japanese Patent Provisional Publication No. 61(1986)-264686) and punched metal.

As the carrier of the anode active material, foil of stainless steel, nickel, titanium or aluminum is generally used. In addition to these metals, also employable are porous nickel (Japanese Patent Provisional Publication No. 58(1983)-18883), porous aluminum (Japanese Patent Provisional Publication No. 58(1983)-38466), sintered aluminum (Japanese Patent Provisional Publication No. 59(1984)-130074), moldings of aluminum fibers (Japanese Patent Provisional Publication No. 59(1984)-148277), silver-plated stainless steel (Japanese Patent Provisional Publication No. 60(1985)-41761), burned carbonaceous material such as burned phenolic resin (Japanese Patent Provisional Publication No. 60(1985)-112254), Al-Cd alloy (Japanese Patent Provisional Publication No. 60(1985)-211779) and porous foaming metal (Japanese Patent Provisional Publication No. 61(1986)-74268).

As a collector, any electronic conductor can be employed unless it induces chemical reaction in the prepared battery. For example, stainless steel, titanium and nickel are generally used. Further, also employable are nickel-plated copper (Japanese Patent Provisional Publication No. 48(1973)-36627), titanium-plated copper and copper-treated stainless steel which is suitable when sulfides are used as the cathode active material (Japanese Patent Provisional Publication No. 60(1985)-175373).

The above-mentioned materials can be employed for a battery of any shape such as coin-type, button-type, sheet-type or cylindrical type.

The following examples further illustrate the present invention, but these examples by no means restrict the invention.

EXAMPLE 1

A carbonaceous material was prepared by burning polyacrylonitrile fiber (Cashmilon FCW BR of Asahi Chemical Industry Co., Ltd.; 15 denier) in the condition of no orientation in the following manner:

STEP 1: increasing temperature in air from room temperature to 230° C. at the rate of 12° C./minute, keeping the temperature of 230° C. for 1 hour, and then cooling to room temperature for 2 hours; by means of a muffle furnace (FP-31 available from Yamato Scientific Co., Ltd.), STEP 2: increasing temperature in argon from room temperature to 500° C. at the rate of 15° C./minute, keeping the temperature of 500° C. for 1 hour, and then cooling to room temperature for 3 hours; by means of a muffle furnace (FP-31 available from Yamato Scientific Co., Ltd.), STEP 3: increasing temperature in vacuum of $10^{-5}$ to $10^{-6}$ mmHg from room temperature to 1,000° C. at the rate of 95° C./minute, keeping the temperature of 1,000° C. for 1 hour, and then cooling to room temperature for 1 hour; by means of a high temperature vacuum furnace (TV-1300R available from Tokyo Shinku Co., Ltd.), and STEP 4: increasing temperature from room temperature to 3,000° C. at the rate of 6° C./minute, keeping the temperature of 3,000° C. for 1 hour, and then cooling to room temperature for 36 hours.

Figure 2:
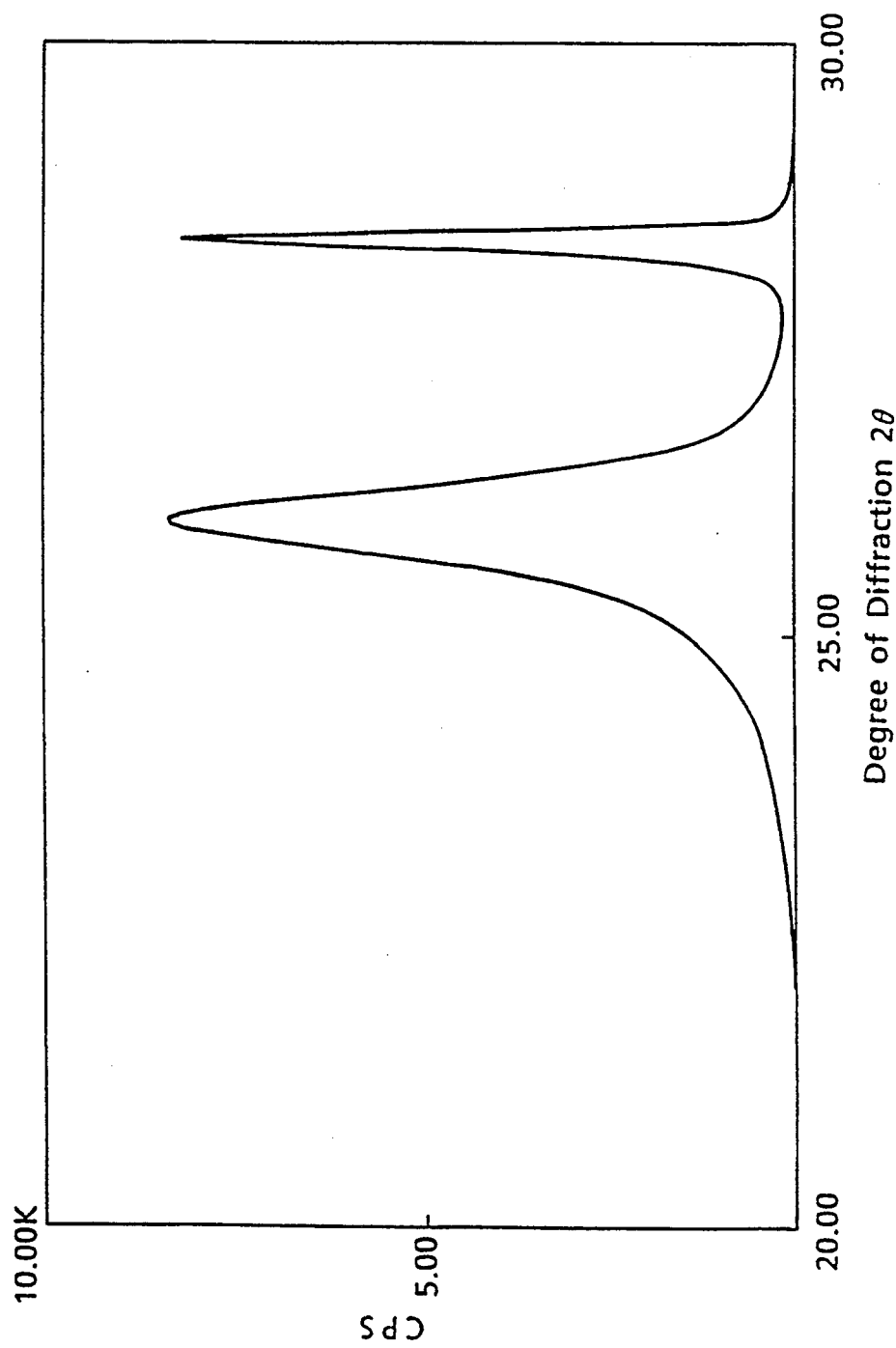
FIG. 2 is an X-ray diffraction spectrum of the carbonaceous material used in Battery 1 of Example 1, which is prepared by burning polyacrylonitrile fiber at 3,000° C. without orientation.

X-ray diffraction spectrum of Cu-K$\alpha$ ray of the obtained carbonaceous material is shown in FIG. 2. It was determined from the X-ray diffraction spectrum that the interval of 002 faces (i.e., maximum of the diffraction peak) was 3.42 Å, the length of a crystallite in c-axis direction was 98.2 Å, and the half width ($2\theta$) of the diffraction peak was 0.77°. The diffraction peak was essentially single in the range of 0.5 to 1.2° (half width ($2\theta$)). Further, the magnetic resistance $(\Delta\rho/\rho)_{cr}$ of the obtained carbonaceous material was confirmed to be negative.

The prepared carbonaceous material was grained in an automatic mortar (Type ANM1000 available from Nitto Kagaku Co., Ltd.) into particles of a mean size of 18 $\mu$m (measured in the laser diffraction type-grain size analyzer LA-500 available from Horiba, Ltd.). The obtained carbonaceous material powder (80 wt.%), acetylene black (Denkablack available from Denki Kagaku Kogyo K.K.; 10 wt.%), polytetrafluoroethylene (Wako Wako Pure Chemical Industries, Ltd.; 5 wt.%) and ethylene-propylene-diene copolymer EPDM (ESPRENE available from Sumitomo Chemical Co., Ltd.; 5 wt.%) were dispersed in toluene, sufficiently stirred to mix and then dried to prepare a mixture for anode (depolarizing mix for anode). The obtained mixture was molded and pressed to form a pellet (Diameter: 13 mm). The prepared pellet was used as an anode material.

Independently, $Li_{1.0}Co_{0.95}V_{0.05}O_{2.5}$ (85 wt.%), acetylene black (Denkablack available from Denki Kagaku Kogyo K.K.; 10 wt.%) for conductor and polytetrafluoroethylene (Wako Pure Chemical Industries, Ltd.; 5 wt.%) for binder were mixed to prepare a mixture for cathode (depolarizing mix for cathode). The obtained mixture was molded and pressed to form a pellet (Diameter: 13 mm). The prepared pellet was used as a cathode material. The volume ratio of the cathode to the anode was adjusted to 15 so that the characteristics of the constituted battery might mainly depend on the anode.

As the electrolytic conductor, 1 mol/l solution of $LiBF_4$ (dissolved in a solvent which was prepared by mixing equal volumes of propylene carbonate and 1,2-dimethoxyethane) was used. A porous sheet of polypropylene and nonwoven fabric of polypropylene were superposed and used as the separator.

In the above-described manner, a secondary battery of coin-type shown in FIG. 1 was produced (Battery 1).

In FIG. 1, the anode pellet 2 is sealed between the anode seal 1 and the separator 3, the cathode seal 1 is sealed between the cathode case 6 having the collector 5 and the separator 3, and the gasket 7 is provided between the outer periphery of the anode seal 1 and that of the gasket 7.

The charging-discharging test was carried out by iteratively charging the battery at 150 mAH/g and discharging from the battery to 3.2 V, current density being 1 mA/cm$^2$. In the test, the charging-discharging capacity loss was measured after the 10th cycle was complete, and the charging-discharging capacity was measured at the 25th cycle to evaluate the performance of the battery.

EXAMPLE 2

The procedures of Example 1 were repeated except for not adding acetylene black to the anode material to prepare a secondary battery (Battery 2). With respect to the obtained battery, the same test as described in Example 1 was carried out.

EXAMPLE 3

The procedures of Example 1 were repeated except for using $LiCoO_2$ in stead of $Li_{1.0}Co_{0.95}V_{0.05}O_{2.5}$ as the cathode material to prepare a secondary battery (Battery 3). With respect to the obtained battery, the same test as described in Example 1 was carried out.

EXAMPLE 4

A carbonaceous material was prepared in the same manner as described in Example 1 except for using another polyacrylonitrile fiber (Cashmilon FK BR available from Asahi Chemical Industry Co., Ltd.; 5 denier) in stead of the polyacrylonitrile fiber of Example-1 (Cashmilon FCW BR available from Asahi Chemical Industry Co., Ltd.; 15 denier). It was determined from the X-ray diffraction spectrum of the obtained carbonaceous material that an interval of 002 faces (i.e., maximum of the diffraction peak) was 3.42 Å, length of a crystallite in c-axis direction was 91.0 Å, and the half width ($2\theta$) of the diffraction peak was 0.89°. Further, the magnetic resistance $(\Delta\rho/\rho)_{cr}$ of the obtained carbonaceous material was confirmed to be negative.

The prepared carbonaceous material was grained into particles of mean size 25 $\mu$m in the same manner as described in Example 1. Using the carbonaceous material powder, the procedures of Example 1 were repeated to prepare a secondary battery (Battery 4). With respect to the obtained battery, the same test as described in Example 1 was carried out.

EXAMPLE 5

A carbonaceous material was prepared in the same manner as described in Example 1 except for using another polyacrylonitrile fiber (Beslon B-15 available from Toho Rayon Co., Ltd.; 15 denier) in stead of the polyacrylonitrile fiber of Example 1 (Cashmilon FCW BR of Asahi Chemical Industry Co., Ltd.; 15 denier). It was determined from the X-ray diffraction spectrum of the obtained carbonaceous material that an interval of 002 faces (i.e., maximum of the diffraction peak) was 3.42 Å, length of a crystallite in c-axis direction was 100.8 Å, and the half width ($2\theta$) of the diffraction peak was 0.72°. Further, the magnetic resistance $(\Delta\rho/\rho)_{cr}$ of the obtained carbonaceous material was confirmed to be negative.

The prepared carbonaceous material was grained into particles of mean size 25 $\mu$m in the same manner as described in Example 1. Using this carbonaceous material powder, the procedures of Example 1 were repeated to prepare a secondary battery (Battery 5). With respect to the obtained battery, the same test as described in Example 1 was carried out.

EXAMPLE 6

A carbonaceous material was prepared in the same manner as described in Example 1 except for using another polyacrylonitrile fiber (Beslon B-5 available from Toho Rayon Co., Ltd.; 5 denier) in stead of the polyacrylonitrile fiber of Example-1 (Cashmilon FCW BR available from Asahi Chemical Industry Co., Ltd.; 15 denier). It was determined from the X-ray diffraction spectrum of the obtained carbonaceous material that an interval of 002 faces (i.e., maximum of the diffraction peak) was 3.42 Å, length of a crystallite in c-axis direction was 93.3 Å, and the half width ($2\theta$) of the diffraction peak was 0.85°. Further, the magnetic resistance ($\Delta\rho/\rho$)$_{cr}$ of the obtained carbonaceous material was confirmed to be negative.

The prepared carbonaceous material was grained into particles of mean size 23 μm in the same manner as described in Example 1. Using the carbonaceous material powder, the procedures of Example 1 were repeated to prepare a secondary battery (Battery 6). With respect to the obtained battery, the same test as described in Example 1 was carried out.

EXAMPLE 7

A carbonaceous material was prepared in the same manner as described in Example 1 except for performing the following step 4 using another polyacrylonitrile fiber in stead of the step 4 of Example 1.

STEP 4: increasing temperature from room temperature to 3,200° C. at the rate of 6° C./minute, keeping the temperature of 3,200° C. for 1 hour, and then cooling to room temperature for 36 hours.

It was determined from the X-ray diffraction spectrum of the obtained carbonaceous material that an interval of 002 faces (i.e., maximum of the diffraction peak) was 3.42 Å, length of a crystallite in c-axis direction was 107.5 Å, and the half width ($2\theta$) of the diffraction peak was 0.72°.

The prepared carbonaceous material was grained into particles of mean size 22 μm in the same manner as described in Example 1. Using the carbonaceous material powder, the procedures of Example 1 were repeated to prepare a secondary battery (Battery 7). With respect to the obtained battery, the same test as described in Example 1 was carried out.

EXAMPLE 8

A carbonaceous material was prepared in the same manner as described in Example 1 except for performing the following step 4 using another polyacrylonitrile fiber in stead of the step 4 of Example 1.

STEP 4: increasing temperature from room temperature to 3,400° C. at the rate of 6° C./minute, keeping the temperature of 3,400° C. for 1 hour, and then cooling to room temperature for 36 hours.

It was determined from the X-ray diffraction spectrum of the obtained carbonaceous material that an interval of 002 faces (i.e., maximum of the diffraction peak) was 3.41 Å, length of a crystallite in c-axis direction was 125.3 Å, and the half width ($2\theta$) of the diffraction peak was 0.72°.

The prepared carbonaceous material was grained into particles of mean size 25 μm in the same manner as described in Example 1. Using the carbonaceous material powder, the procedures of Example 1 were repeated to prepare a secondary battery (Battery 8). With respect to the obtained battery, the same test as described in Example 1 was carried out.

EXAMPLE 9

A carbonaceous material was prepared by burning polyacrylonitrile fiber (Cashmilon FCW BR of Asahi Chemical Industry Co., Ltd.; 15 denier) in the condition of no orientation in the following manner:

STEP 1: step 1 was performed in the same manner as the step 1 of Example 1,

STEP 2: increasing temperature in argon from room temperature to 1,100° C. at the rate of 15° C./minute, keeping the temperature of 1,100° C. for 1 hour, and then cooling to room temperature for 1 hours; by means of a muffle furnace (FP-31 available from Yamato Scientific Co., Ltd.), and STEP 3: increasing temperature from room temperature to 3,100° C. at the rate of 6° C./minute, keeping the temperature of 3,100° C. for 1 hour, and then cooling to room temperature for 36 hours.

It was determined from the X-ray diffraction spectrum of the obtained carbonaceous material that an interval of 002 faces (i.e., maximum of the diffraction peak) was 3.42 1 Å, length of a crystallite in c-axis direction was 104.9 Å, and the half width ($2\theta$) of the diffraction peak was 0.77°.

The prepared carbonaceous material was grained into particles of mean size 21 μm in the same manner as described in Example 1. Using the carbonaceous material powder, the procedures of Example 1 were repeated to prepare a secondary battery (Battery 9). With respect to the obtained battery, the same test as described in Example 1 was carried out.

COMPARISON EXAMPLE 1

A carbonaceous material was prepared in the same manner as described in Example 1 except that STEP 4 was not carried out.

Figure 3:
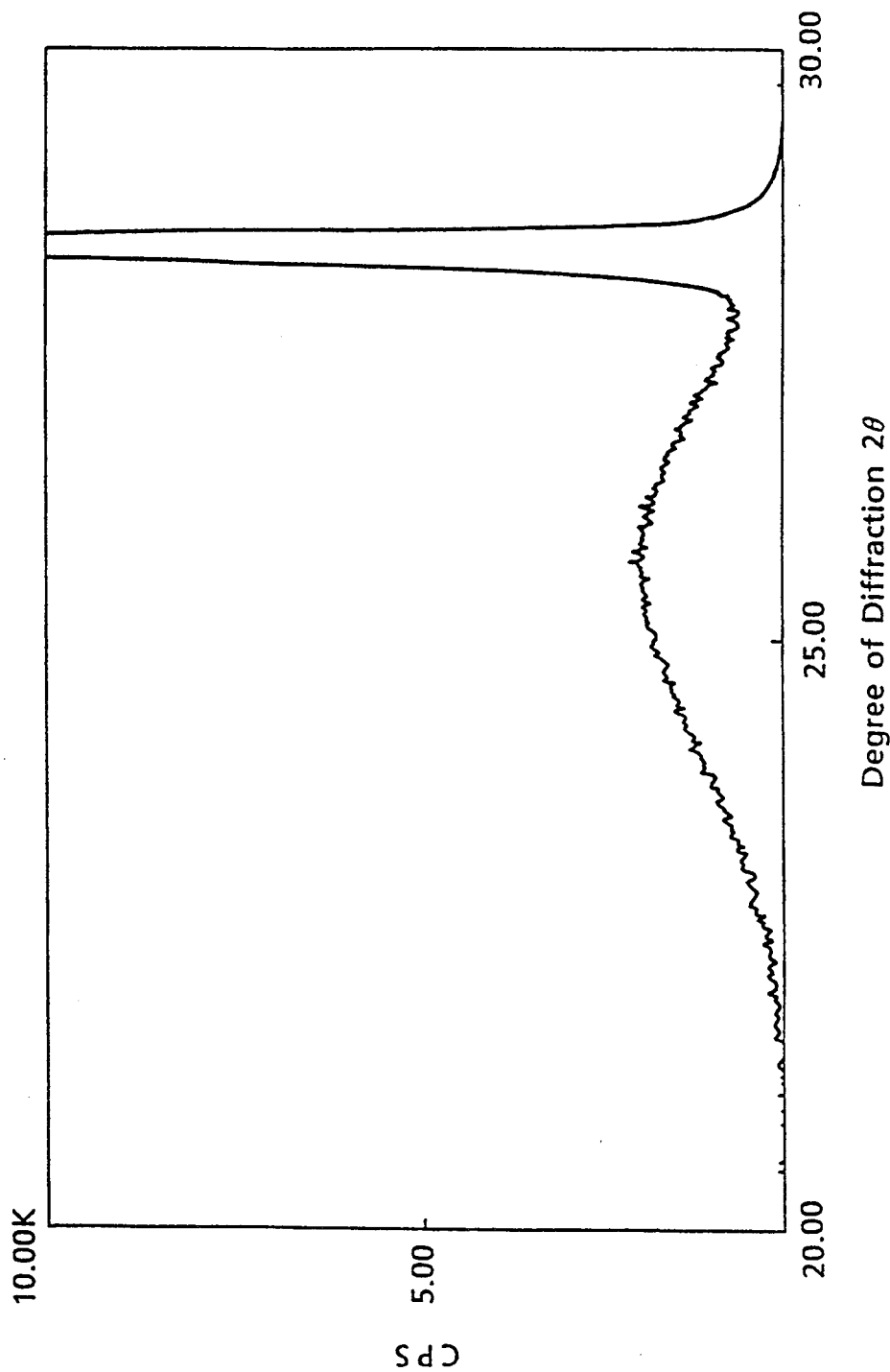
FIG. 3 is an X-ray diffraction spectrum of the carbonaceous material used in Battery "a" of Comparison Example 1, which is prepared by burning polyacrylonitrile fiber at 1,000 ° C. without orientation.

X-ray diffraction spectrum of Cu-Kα ray of the obtained carbonaceous material is shown in FIG. 3. It was determined from the X-ray diffraction spectrum of the obtained carbonaceous material that an interval of 002 faces (i.e., maximum of the diffraction peak) was 3.47 Å, length of a crystallite in c-axis direction was 18.5 Å, and the half width ($2\theta$) of the diffraction peak was 3.43°. Further, the magnetic resistance ($\Delta\rho/\rho$)$_{cr}$ of the obtained carbonaceous material was confirmed to be negative.

The prepared carbonaceous material was grained into particles of mean size 16 μm in the same manner as described in Example 1. Using the carbonaceous material powder, the procedures of Example 1 were repeated to prepare a secondary battery (Battery a). With respect to the obtained battery, the same test as described in Example 1 was carried out.

COMPARISON EXAMPLE 2

A carbonaceous material was prepared in the same manner as described in Example 1 except for performing the following step 4 using another polyacrylonitrile fiber in stead of the step 4 of Example 1.

STEP 4: increasing temperature from room temperature to 2,300° C. at the rate of 6° C./minute, keeping the temperature of 2,300° C. for 1 hour, and then cooling to room temperature for 36 hours.

Figure 4:
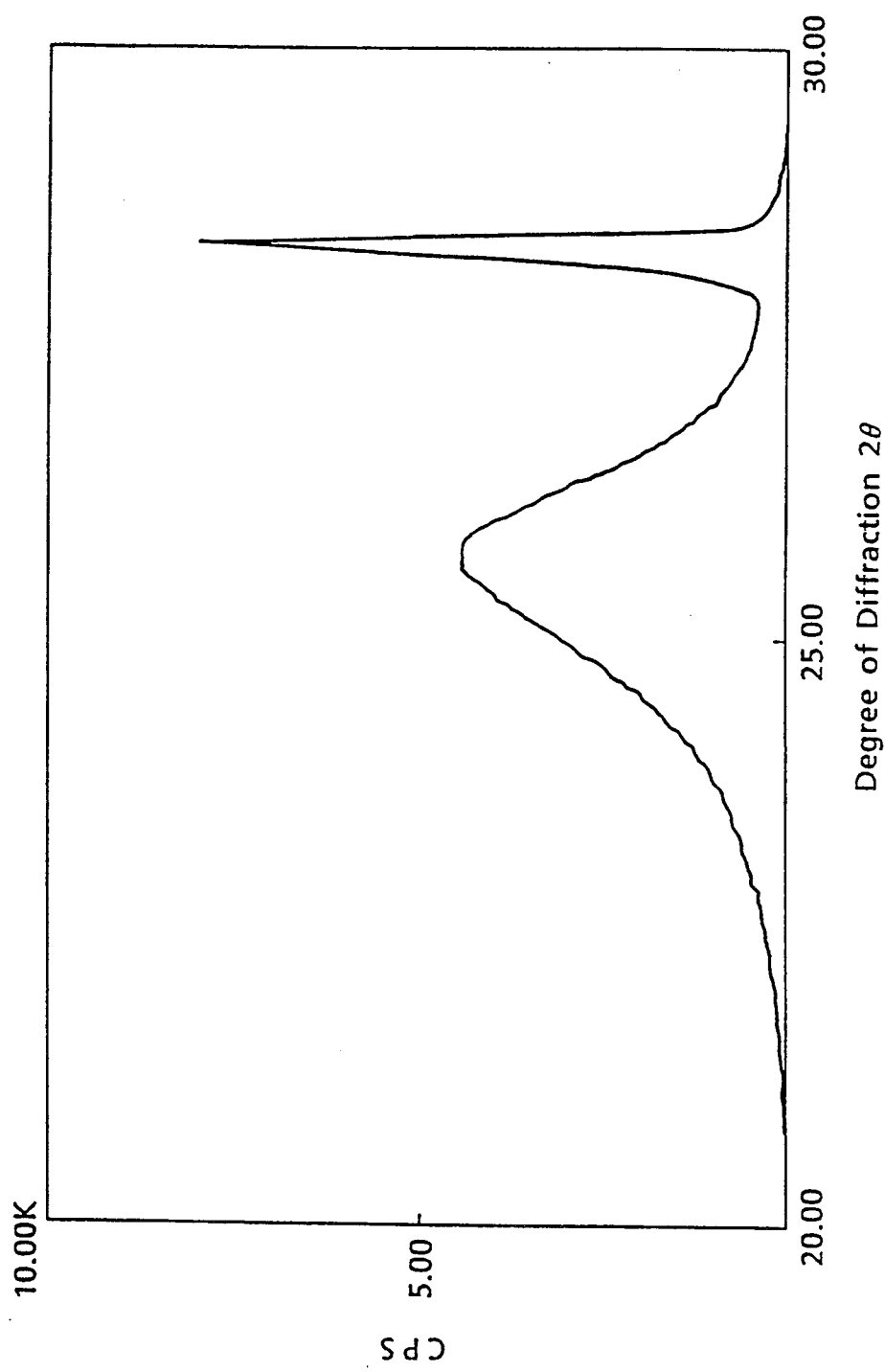
FIG. 4 is an X-ray diffraction spectrum of the carbonaceous material used in Battery "b" of Comparison Example 2, which is prepared by burning polyacrylonitrile fiber at 2,300° C. without orientation.

X-ray diffraction spectrum of Cu-Kα ray of the obtained carbonaceous material is shown in FIG. 4. It was determined from the X-ray diffraction spectrum of the obtained carbonaceous material that an interval of 002 faces (i.e., maximum of the diffraction peak) was 3.47 Å, length of a crystallite in c-axis direction was 56.5 Å, and the half width (2θ) of the diffraction peak was 1.37°. Further, the magnetic resistance $(\Delta\rho/\rho)_{cr}$ of the obtained carbonaceous material was confirmed to be negative.

The prepared carbonaceous material was grained into particles of mean size 21 μm in the same manner as described in Example 1. Using the carbonaceous material powder, the procedures of Example 1 were repeated to prepare a secondary battery (Battery b). With respect to the obtained battery, the same test as described in Example 1 was carried out.

COMPARISON EXAMPLE 3

Using commercially available polyacrylonitrile carbon fiber (Toreca M-40 available from Toray Industries, Inc.) in stead of the polyacrylonitrile fiber as starting material, a carbonaceous material was prepared. The starting material was burned single-stepwise in the manner of STEP 4 described in Example 1.

Figure 5:
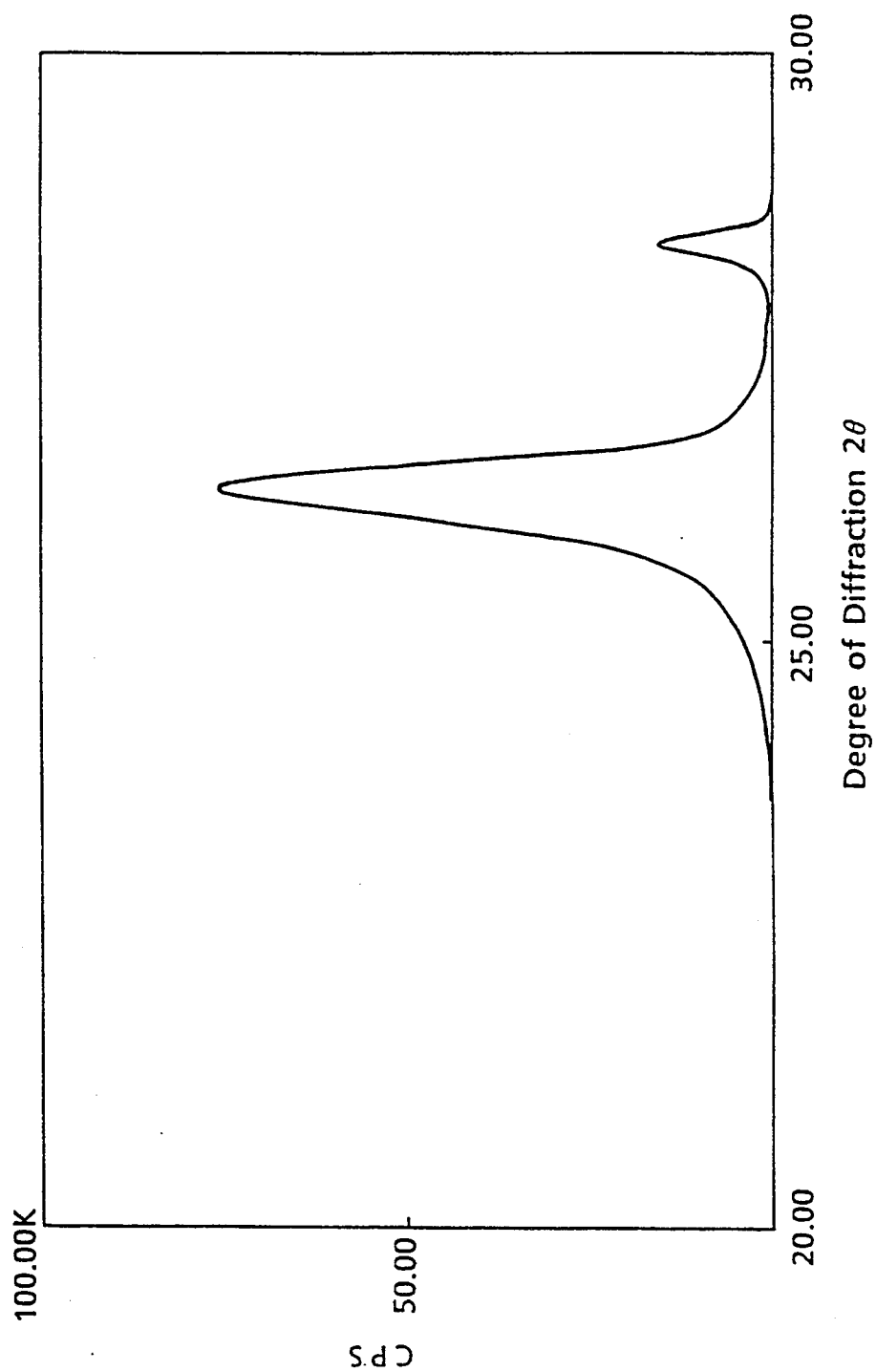
FIG. 5 is an X-ray diffraction spectrum of the carbonaceous material used in Battery "c" of Comparison Example 3, which is prepared by burning polyacrylonitrile carbon fiber at 3,000° C. without orientation.

X-ray diffraction spectrum of Cu-Kα ray of the obtained carbonaceous material is shown in FIG. 5. It was determined from the X-ray diffraction spectrum of the obtained carbonaceous material that an interval of 002 faces (i.e., maximum of the diffraction peak) was 3.37 Å, length of a crystallite in c-axis direction was 176.1 Å, and the half width (2θ) of the diffraction peak was 0.58°. Further, the magnetic resistance $(\Delta\rho/\rho)_{cr}$ of the obtained carbonaceous material was confirmed to be negative.

The prepared carbonaceous material was grained into particles of mean size 27 μm in the same manner as described in Example 1. Using the carbonaceous material powder, the procedures of Example 1 were repeated to prepare a secondary battery (Battery c). With respect to the obtained battery, the same test as described in Example 1 was carried out.

The results of the charging-discharging test for the produced batteries are set forth in Table 3.

TABLE 3

| | | Performance of Battery | |
|---|---|---|---|
| Battery No. | | Capacity Loss*1) (mAH/g) | Capacity*2) (mAH/g) |
| Example 1 | Battery 1 | 105 | 195 |
| Example 2 | Battery 2 | 110 | 175 |
| Example 3 | Battery 3 | 108 | 190 |
| Example 4 | Battery 4 | 127 | 187 |
| Example 5 | Battery 5 | 98 | 205 |
| Example 6 | Battery 6 | 120 | 190 |
| Example 7 | Battery 7 | 96 | 201 |
| Example 8 | Battery 8 | 93 | 209 |
| Example 9 | Battery 9 | 131 | 183 |
| Comp.Ex.1 | Battery a | 368 | 115 |
| Comp.Ex.2 | Battery b | 238 | 125 |
| Comp.Ex.3 | Battery c | 518 | 118 |

Notes:
*1)measured after the 10th cycle was complete
*2)measured at the 25th cycle The burning conditions and measured values of the carbonaceous materials for the anode active materials used for the batteries are also set forth in Tables 4A and 4B.

TABLE 4A

| | Burning Temp. | | X-ray diffraction | | | |
|---|---|---|---|---|---|---|
| Battery No. | Stage 3 (°C.) | Stage 4 (°C.) | $d_{002}$ (Å) | $L_c$ (Å) | Half Width (degree) | Spectrum |
| 1 (Ex.1) | 1000 | 3000 | 3.42 | 98.2 | 0.77 | FIG. 2 |
| 2 (Ex.2) | 1000 | 3000 | 3.42 | 98.2 | 0.77 | — |
| 3 (Ex.3) | 1000 | 3000 | 3.42 | 98.2 | 0.77 | — |
| 4 (Ex.4) | 1000 | 3000 | 3.42 | 91.0 | 0.89 | — |
| 5 (Ex.5) | 1000 | 3000 | 3.42 | 100.8 | 0.72 | — |
| 6 (Ex.6) | 1000 | 3000 | 3.42 | 93.3 | 0.85 | — |
| 7 (Ex.7) | 1000 | 3200 | 3.42 | 107.5 | 0.72 | — |
| 8 (Ex.8) | 1000 | 3400 | 3.41 | 125.3 | 0.68 | — |
| 9 (Ex.9) | 3100 | — | 3.42 | 104.9 | 0.77 | — |
| a (Com.Ex.1) | 1000 | — | 3.47 | 18.5 | 3.43 | FIG. 3 |
| b (Com.Ex.2) | — | 2300 | 3.47 | 56.5 | 1.37 | FIG. 4 |
| c (Com.Ex.3) | — | 3000 | 3.37 | 176.5 | 0.58 | FIG. 5 |

TABLE 4B

| Battery No. | Magnetic Resistance $(\Delta\rho/\rho)_{cr}$ (%) | Mean Grain Size (μm) | Starting Material |
|---|---|---|---|
| 1 (Ex.1) | negative | 18 | fiber: 15 d |
| 2 (Ex.2) | negative | 18 | fiber: 15 d |
| 3 (Ex.3) | negative | 18 | fiber: 15 d |
| 4 (Ex.4) | negative | 25 | fiber: 5 d |
| 5 (Ex.5) | negative | 25 | fiber: 15 d |
| 6 (Ex.6) | negative | 23 | fiber: 5 d |
| 7 (Ex.7) | negative | 22 | fiber: 15 d |
| 8 (Ex.8) | negative | 25 | fiber: 15 d |
| 9 (Ex.9) | negative | 21 | fiber: 15 d |
| a (Com.Ex.1) | negative | 16 | fiber: 15 d |
| b (Com.Ex.2) | negative | 21 | fiber: 15 d |
| c (Com.Ex.3) | negative | 27 | carbon fiber*1) |

Notes:
*1)polyacrylonitrile carbon fiber

The carbonaceous materials (Examples 1–9) of the invention prepared by burning polyacrylonitrile fiber at a high temperature without orientation have specific characteristics determined from X-ray diffraction spectrum Cu-Kα ray thereof. In more detail, the values of interval ($d_{002}$) of 002 faces (i.e., maximum of the diffraction peak) were in the range of 3.41 to 3.42 Å, the values of length ($L_c$) of a crystallite in c-axis direction were in the range of 91 to 126 Å, the values of the half width (2θ) of the diffraction peak were in the range of 0.75 to 0.89°, and each diffraction peak was single in the range of 0.5 to 1.2° (half width (2θ)). Further, the magnetic resistance $(\Delta\rho/\rho)_{cr}$ was negative.

Each of the batteries 1 to 9 having the anode containing the above carbonaceous materials is much superior to the Batteries "a" and "b", each of which comprises the anode containing the low-crystalline carbonaceous material burned at not more than 2,300° C. of which diffraction peak ($d_{002}$) is broad, from the viewpoint of both the charging-discharging capacity loss and the charging-discharging capacity.

The battery "c" having the anode containing the burned material prepared by burning commercially available polyacrylonitrile carbon fiber at more than 2,400° C. shows high capacity loss and has small charging-discharging capacity.

As is evident from the results of Examples and Comparison Examples, the battery of the invention using the anode active material of the carbonaceous material having the specific characteristics obtained from X-ray diffraction spectrum, which is prepared by burning polyacrylonitrile fiber multi-stepwise, is greatly improved in the charging-discharging capacity loss and charging-discharging capacity.

We claim:

1. A nonaqueous secondary battery which comprises an anode active material comprising a carbonaceous material, an electrolyte and a cathode active material comprising a lithium-containing transition metal chalcogenide;

wherein said carbonaceous material is a carbonized polyacrylonitrile obtained by burning polyacrylonitrile fiber of 0.4 to 40 denier at 2,400° to 3,500° C., said polyacrylonitrile fiber consisting essentially of a polyacrylonitrile or a copolymer of acrylonitrile and other monomers polymerizable with acrylonitrile, and wherein said carbonaceous material has length of a crystallite in c-axis direction of 75 to 250 Å and an interval of 002 faces of 3.41 to 3.44 Å, said length and said interval being determined from an X-ray diffraction spectrum thereof using Cu-K$\alpha$ ray.

2. The nonaqueous secondary battery as defined in claim 1, wherein said carbonaceous material has an essentially single diffraction peak of which half width is in the range of 0.5 to 1.2 degree, said peak being shown in an X-ray diffraction spectrum thereof using Cu-K$\alpha$ ray.

3. The nonaqueous secondary battery as defined in claim 1, wherein said carbonaceous material is subjected to a first burning step of heating said fiber at 150° to 300° C. and thereafter cooling, and a second burning step of burning said fiber at 400° to 2,000° C. and thereafter cooling, before said burning at 2,400° to 3,500° C.

4. The nonaqueous secondary battery as defined in claim 1, wherein said carbonaceous material is subjected to a first burning step of heating said fiber at 150° to 300° C. and thereafter cooling, a second burning step of heating said fiber at 400° to 800° C. and thereafter cooling, and a third burning step of heating said fiber at 900° to 2000° C. and thereafter cooling, before said burning at 2,400° to 3,500° C.

5. The nonaqueous secondary battery as defined in claim 1, wherein said burning of said polyacrylonitrile fiber is conducted in the condition of no orientation.

6. The nonaqueous secondary battery as defined in claim 1, wherein said carbonaceous material is obtained by burning said polyacrylonitrile fiber at 3,000 to 3,500° C.

* * * * *